(12) United States Patent
Schelhaas et al.

(10) Patent No.: US 10,770,915 B2
(45) Date of Patent: Sep. 8, 2020

(54) POWER GENERATING APPARATUS

(71) Applicant: Lodestar Systems Limited, Herne Bay (GB)

(72) Inventors: Paul Schelhaas, Canterbury (GB); Simon Legrand, Canterbury (GB)

(*) Notice: Subject to any disclaimer, the term of this patent is extended or adjusted under 35 U.S.C. 154(b) by 0 days.

(21) Appl. No.: 15/571,413

(22) PCT Filed: May 20, 2016

(86) PCT No.: PCT/EP2016/061484
§ 371 (c)(1),
(2) Date: Nov. 2, 2017

(87) PCT Pub. No.: WO2016/185034
PCT Pub. Date: Nov. 24, 2016

(65) Prior Publication Data
US 2018/0138736 A1    May 17, 2018

(30) Foreign Application Priority Data
May 20, 2015 (GB) .................................. 1508656.4

(51) Int. Cl.
*H02J 7/00* (2006.01)
*H02J 7/35* (2006.01)
(Continued)

(52) U.S. Cl.
CPC ........ *H02J 7/35* (2013.01); *F21L 4/08* (2013.01); *G08B 13/19621* (2013.01);
(Continued)

(58) Field of Classification Search
CPC . H02J 7/35; H02J 7/355; Y02E 60/12; H01M 10/465; H01M 16/006
(Continued)

(56) References Cited

U.S. PATENT DOCUMENTS 6,407,533 B1    6/2002  Bartek et al.
2006/0017809 A1  1/2006  Caroll
(Continued)

FOREIGN PATENT DOCUMENTS

GB   2450753 A       7/2009
WO   2014056086 A1   4/2014
WO   2015/184127 A2  12/2015

OTHER PUBLICATIONS

International Search Report, Application No. PCT/EP2016/061484, dated Sep. 15, 2016, 3 pages.
(Continued)

*Primary Examiner* — Arun C Williams
(74) *Attorney, Agent, or Firm* — Liang & Hennessey; Stanley D. Liang; Brian E. Hennessey

(57) ABSTRACT

A power generating apparatus for use in remote locations, the apparatus including a static base adapted to support a housing and an elongate device support element which is adapted to be upstanding in use, wherein the housing is insulated; an electrical energy storage assembly located within a compartment defined by the housing, the electrical energy storage assembly having an electrical input and an electrical output, and comprising one or more rechargeable batteries; an electrical energy generator carried externally by the housing, wherein the electrical energy generator is the sole source of electrical energy and is in the form of one or more photovoltaic panels configured to convert solar energy into electrical energy, the electrical energy from the electrical energy generator being electrically connected to the input of the energy storage assembly; and a powered device carried by the device support element, the powered device being selected from a camera, a lighting apparatus, a wireless communications assembly and combinations thereof,
(Continued)

wherein the powered device is electrically coupled to the output of the energy storage assembly.

20 Claims, 4 Drawing Sheets

(51) Int. Cl.

| | | |
|---|---|---|
| *H02S 10/40* | (2014.01) | |
| *F21L 4/08* | (2006.01) | |
| *G08B 13/196* | (2006.01) | |
| *H02J 7/14* | (2006.01) | |
| *F21S 9/03* | (2006.01) | |
| *F21Y 115/10* | (2016.01) | |
| *F21V 21/22* | (2006.01) | |
| *F21W 131/10* | (2006.01) | |

(52) U.S. Cl.
CPC ...... *G08B 13/19632* (2013.01); *H02J 7/0042* (2013.01); *H02J 7/14* (2013.01); *H02S 10/40* (2014.12); *F21S 9/032* (2013.01); *F21S 9/037* (2013.01); *F21V 21/22* (2013.01); *F21W 2131/1005* (2013.01); *F21Y 2115/10* (2016.08); *G08B 13/19656* (2013.01); *Y02E 10/566* (2013.01)

(58) Field of Classification Search
USPC ........................................................ 320/101
See application file for complete search history.

(56) References Cited

U.S. PATENT DOCUMENTS

| | | | |
|---|---|---|---|
| 2009/0047234 A1 | 2/2009 | Touitou et al. | |
| 2009/0205703 A1* | 8/2009 | Umotoy ................ | F24J 2/5203 |
| | | | 136/251 |
| 2009/0288691 A1* | 11/2009 | Hunt ....................... | B08B 3/02 |
| | | | 134/57 R |
| 2010/0029268 A1* | 2/2010 | Myer ....................... | F21S 2/00 |
| | | | 455/426.1 |
| 2010/0043851 A1 | 2/2010 | Levy et al. | |
| 2010/0225266 A1* | 9/2010 | Hartman ............. | B60L 11/1822 |
| | | | 320/101 |
| 2010/0277584 A1 | 11/2010 | Price | |
| 2012/0201016 A1 | 8/2012 | Robertson et al. | |
| 2013/0142614 A1 | 6/2013 | Monsive, Jr. | |
| 2013/0234645 A1* | 9/2013 | Goei ..................... | H02J 7/0052 |
| | | | 320/101 |
| 2013/0250561 A1 | 9/2013 | Knodel | |
| 2014/0028240 A1* | 1/2014 | Heumann ............. | H02J 7/0052 |
| | | | 320/101 |
| 2014/0160738 A1* | 6/2014 | Rozot .................... | F21S 2/005 |
| | | | 362/191 |
| 2014/0208978 A1 | 7/2014 | Sunder | |

OTHER PUBLICATIONS

Great Britain Search Report, Application No. GB1520014.0, dated May 11, 2016, 1 page.

* cited by examiner

POWER GENERATING APPARATUS

The present invention relates to a power generating apparatus, and in particular to a power generating apparatus which is capable of powering a camera, a wireless communications apparatus and/or a lighting apparatus in harsh and/or remote areas.

It is desired to provide a power generating apparatus which can be located at a remote and potentially inhospitable site and which can provide a remote powered device such as a camera, a lighting apparatus, a wireless communications assembly or combinations thereof. Such devices may be useful for monitoring functions or activity at the remote site via a camera and/or providing light via a lighting apparatus. The inhospitable site may experience extremes of temperature and other damaging natural phenomena, such as acidic rain, dust, sand, etc.

Portable power generating apparatus which include photovoltaic panels as an adjunct to an internal combustion engine as a primary or secondary power source are known from US2013/0250561 and WO2014/056086. Portable power generating apparatus are also known from US2012/0201016 and US2006/0017809. However, these apparatus are based upon a mobile platform and are unsuited for harsh conditions as the housing is not insulated.

According to a first aspect of the invention, there is provided a power generating apparatus for use in remote locations, the apparatus including a static base configured to support a housing and an elongate device support element which is configured to be upstanding in use, wherein the housing is insulated; an electrical energy storage assembly is located within a compartment defined by the housing, the electrical energy storage assembly having an electrical input and an electrical output, and comprising one or more rechargeable batteries; an electrical energy generator carried externally by the housing, wherein the electrical energy generator is the sole source of electrical energy and is powered by at least one renewable energy source selected from solar energy and wind energy, the electrical energy generator including one or more photovoltaic panels configured to convert solar energy into electrical energy, the electrical energy from the electrical energy generator being electrically connected to the input of the energy storage assembly; and a powered device carried by the device support element, the powered device being selected from a camera, a lighting apparatus, a wireless communications assembly and combinations thereof, wherein the powered device is electrically coupled to the output of the energy storage assembly.

In the first aspect of the invention, the rechargeable batteries are protected from the environment by the compartment within the insulated housing. The batteries are charged by the electrical energy generator carried by the apparatus and the batteries power the electrical device. The electrical energy generator suitably generates more electrical energy in a given period than is consumed by the electrical device. In this way, the apparatus can be located at a remote site and the remote site can be monitored in embodiments in which the electrical device includes a camera and/or illuminated in embodiments in which the electrical device includes a lighting apparatus and/or provide a wireless communications network in embodiments in which the electrical device includes a wireless communications assembly.

In the context of the present invention, a photovoltaic panel is a panel which carries a plurality of photovoltaic cells upon a surface thereof. The panels may be substantially planar or curved and they may be rigid or have a degree of flexibility. The photovoltaic cells may be protected via a polymeric or glass layer. The photovoltaic cells convert solar energy to electrical energy.

The term "wireless communications assembly" is an apparatus which is capable of receiving and transmitting wireless signals, such as video, data and voice communications. It will be appreciated that such an assembly can function as a booster for an existing wireless network or it can provide a wireless communications network at a remote site.

Suitably, the or each photovoltaic panel of the electrical energy generator is carried by the housing of the apparatus.

The electrical energy generator may comprises two or more photovoltaic panels. In such embodiments, the electrical energy generator may comprises at least one fixed photovoltaic panel and at least one movable photovoltaic panel which has a variable orientation. The fixed panel, where present, suitably has a substantially vertical orientation, e.g. within about 10° of a vertical plane. According to an embodiment of the invention, the electrical energy generator may comprise one or more photovoltaic panels which is/are adapted to have a variable orientation. The apparatus suitably includes two or more photovoltaic panels. The term "variable orientation" means that at least one of the panels may be mounted for movement, such as rotation, relative to a fixed plane, such as a vertical plane. In this way, the panels may be moved periodically for optimum solar performance.

In embodiments of the invention in which one or more panels is mounted for variable orientation, the or each panel may include a motor adapted to move the panel from a first orientation to a second orientation. In this embodiment, the motor may be controlled such that the orientation of the panel tracks the position of the sun in the sky to provide a desired amount of solar irradiation. Alternatively, the motor may be controlled to move the respective panel periodically. The motor may include a controller which may be adapted to receive a control signal such that the orientation of the respective panel may be controlled remotely.

The fixed panels, where present prevent or resist an accumulation of snow or other solid contaminant (such as sand or dust) on the panel. Thus, even though a vertical or near vertical orientation may not provide an optimum solar performance, such panels are nevertheless still able to generate electrical energy when other panels may be compromised by foreign matter, such as snow, sand, dirt or dust.

Suitably, in embodiments in which at least one of the photovoltaic panels is configured to have a variable orientation, the or each photovoltaic panel may have an operational orientation in which it is arranged for optimum solar strike (i.e. is arranged to receive a desired level of solar energy) and it may have a transport orientation in which the or each panel is arranged to lie parallel and adjacent to the housing or the device support element.

In order to protect the photovoltaic cells carried by the photovoltaic panels, the or each photovoltaic panel may be coated with protective barrier layer formed from a glass material or a polymeric material. Suitably, the protective barrier layer does not reduce or impair the intensity of the light which strikes the photovoltaic cells. Thus, it does not reduce the efficiency or electrical output of the photovoltaic panel. The protective barrier layer is suitably a hydrophobic material.

It will be appreciated that a build up of dust, dirt, sand or any other contaminants on the panels will reduce the electrical output of the panel. Therefore, the or each panel may include a fluid cleaning apparatus. The fluid cleaning apparatus suitably includes a fluid reservoir, a pump and at least one nozzle to direct a flow of the cleaning fluid across the panel. The cleaning fluid may be compressed air (in which case, the fluid reservoir may be the atmosphere around the housing); an aqueous liquid; or an organic liquid. The fluid is suitably an aqueous liquid. The aqueous liquid may include additives, such as a detergent or an agent to lower the freezing point of the liquid (an anti-freeze).

At least one of the photovoltaic panels may be flexible. This allows for solar performance across a wide range of solar positions.

In an embodiment of the invention, the housing includes an outer housing wall and an inner housing wall and a gap is defined between the inner and outer housing walls. In this embodiment, the gap provides a thermal insulating barrier, maintaining the interior of the housing cooler when the external temperature is relatively high and maintaining the interior of the housing warmer when the external temperature is relatively low. Accordingly, the gap itself may define the insulation. Alternatively, the gap may be filled with an insulating material. Suitably, an insulating material may be carried by the walls of the housing. This may be in addition to the housing comprising a double-skinned wall or as an alternative to it.

For a cooling effect for the interior of the housing, a wall (or outer wall in the case of an inner and outer wall construction) of the housing may include one or more vents in communication with the environment external to the housing. The vent may closable and may define a vented configuration in which the interior of the housing is in fluid communication with an external environment, and a closed configuration in which the interior of the housing is isolated from the external environment. Thus, the vent may be opened to vent heat out of the housing and prevent the energy storage assembly and other components from overheating when the external temperature is relatively high, and, if the external temperature is relatively low (e.g. during winter), the vent may be closed so that interior of the housing is isolated from the external environment in order to prevent heat loss from the interior of the housing.

The housing suitably includes an access door. In order to prevent ingress of contaminants into the interior of the housing, the door may include a seal element, such that when the door is closed, the opening is sealed against the ingress of contaminants into the interior of the housing. Accordingly, the housing may have a sealed configuration in which the interior of the housing is substantially sealed against the ingress of particulate matter, such as dust or sand.

The housing may include a body formed from a metal material, such as steel or aluminium, or it may be formed from a polymeric material. In embodiments in which the housing body is formed from a metal, the metal may be coated to provide protection against corrosion. Such a coating may be a galvanised coating or it may be a polymeric coating, for example, the body of the housing may be powder coated.

In an embodiment of the invention, at least one of the compartment and the or each battery includes a heater element. As the energy storage assembly is located within a compartment defined within the housing, the compartment may include one or more heating elements, which in turn may be electrically connected to the electrical output from the energy storage assembly, such that the compartment may be heated when the external temperature drops below a pre-determined threshold. In this way, the rechargeable batteries of the energy storage assembly are maintained at or above a minimum efficient operating temperature. It is well known that rechargeable batteries experience a significant decrease in efficiency as their temperature decreases and a heated enclosure prevents or minimises the risk that the energy storage assembly will provide less electrical energy than is required to operate the electrical device.

In an embodiment of the invention, the or each rechargeable battery is enclosed within a polymeric barrier layer. The polymeric barrier layer is suitably a relatively poor thermal conductor and functions to provide an additional layer of protection for the battery or batteries which comprise the energy storage assembly. For use in cold climates, the or each rechargeable battery may be enclosed within a polymeric barrier layer and a heating element may be provided within the polymeric barrier layer. In the context of the present invention, the term "within" means that the heating element may be located between the battery and the outer barrier layer or it may be embedded within the polymeric barrier layer. The heating element may be electrically connected to an electrical output from the or each battery. Thus, the or each battery may be self-heating.

In an embodiment of the invention, the temperature of the energy storage assembly is maintained above a threshold temperature. This may be achieved by locating the or each rechargeable battery in the compartment within the housing which is heated or by using self-heating batteries. Thus, the apparatus may comprise a compartment defined within the housing wherein the enclosure includes one or more heating elements electrically connected to an output from the energy storage assembly or the or each rechargeable battery may be enclosed within a polymeric barrier layer and a heating element may be provided within the polymeric barrier layer.

Rechargeable batteries may produce gaseous by-products during operation and such gaseous products may be explosive, flammable and/or toxic. In order to reduce the risk of fire or an explosion within the housing, or the build-up of toxic gases, the energy storage assembly may include one or more exhaust conduits in fluid communication with an environment external to the housing, whereby any gases generated by the energy storage assembly in use are vented outside of the housing.

As the elongate device support element is often several metres high and the electrical device is typically carried at or towards the top of the support element, the device support element is usefully adapted to pivot relative to the base. Additionally or alternatively, the device support element may be configured to telescope relative to the base. In this way, if it is necessary to access the electrical device in situ, the support element may be pivoted and/or telescopically retracted or lowered relative to the base such that access to the electrical device is permitted. The apparatus may include a latch arrangement such that the device support element may be latched in an erect configuration or it may latched in an access configuration in which it has been pivoted about a pivot point and/or telescoped relative to the base. The elongate device support element may be substantially horizontal in its access configuration.

The device support element is suitably formed from a metal, such as steel or aluminium. To minimise the impact of environmental pollutants or contaminants, such as sand, dust, acid rain and such like, the device support element is suitably coated or treated with a protective layer. For example, the metal may be galvanised, powder coated or coated with a polymeric layer.

The base of the apparatus may include apertures or channels which in use are substantially horizontal. Such apertures suitably function as fork-lift access points, whereby the apertures or channels are arranged to receive therein respective forks of a fork-lift truck. Additionally or alternatively, the base may include one or more lifting couplings which are adapted to be coupled to respective cables, chains or ropes of a lifting apparatus, such as a crane. Accordingly, the power generating apparatus of the invention may be portable, but not by itself mobile. In the context of the present invention, portable is intended to be understood as the apparatus may be moved from one place to another by placing it on the bed of a lorry or other suitable transporter, whereas mobile is intended to mean that the base is wheeled such that it can be towed from place to place. Thus, the static base of the invention is not capable of translational movement relative to the ground; it has to be raised above the ground before it can be moved.

According to an embodiment of the invention, the apparatus further includes a GPS location device electrically connected to an output from the energy storage assembly. Such an arrangement allows a remote monitoring station to ensure its correct location and also to help locate the apparatus in the event of theft or unauthorised movement of the apparatus.

According to a further embodiment of the invention, the apparatus further includes a wireless communications receiver/transmitter. The wireless communications receiver/transmitter is suitably electrically connected to an output from the energy storage assembly. The wireless communications receiver/transmitter allows images captured by the camera (where the electrical device comprises a camera) to be transmitted to a remote monitoring station. It also allows for electronic remote control signals to be sent to the apparatus and for performance and status information concerning the apparatus to be sent to the remote monitoring station.

The skilled person will appreciate that the features described and defined in connection with the aspect of the invention and the embodiments thereof may be combined in any combination, regardless of whether the specific combination is expressly mentioned herein. Thus, all such combinations are considered to be made available to the skilled person.

An embodiment of the invention will now be described, by way of example only, with reference to the accompanying drawings in which.

For the avoidance of doubt, the skilled person will appreciate that in this specification, the terms "up", "down", "front", "rear", "upper", "lower", "width", etc. refer to the orientation of the components as found in the example when installed for normal use as shown in the Figures.

Figure 1:
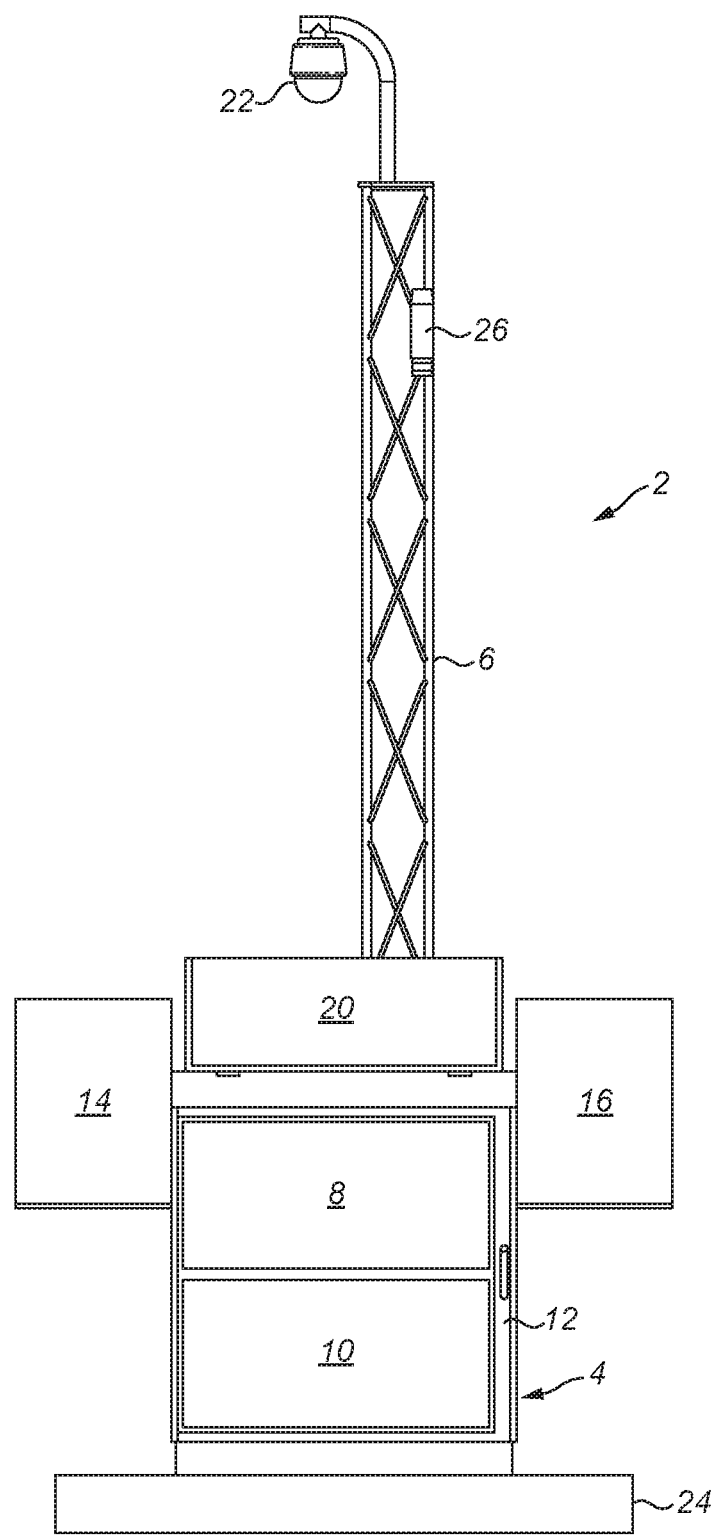
FIG. 1 is front elevational view of a power generating apparatus according to the first aspect of the invention.

FIG. 1 shows a power generating apparatus 2 comprising a housing in the form of a cabinet 4 and an elongate device support element in the form of a post 6. The post 6 is formed from a latticework of metal struts, which are galvanised for corrosion resistance.

The cabinet 4 carries five photovoltaic panels which together are capable of generating 500 W of power. Two of the panels 8, 10 are mounted vertically on a door 12 of the cabinet 4. These two panels are fixed. Two of the panels 14, 16 are pivotally mounted to the sides of the cabinet 4 (best seen in FIG. 3). The panels 14, 16 are carried by a common orientation rod 18 located at the mid-point of the panel and the rod 18 is rotationally coupled to an aperture formed in opposed sides of the cabinet 4, such that as the rod is rotated relative to the cabinet, the angle between each photovoltaic panel 14, 16 and a vertical axis is varied. The fifth photovoltaic panel 20 is hingedly coupled to the top of the cabinet 4.

At the top of the post 6 is located a CCTV video camera 22 which can pan, tilt and zoom (a PTZ camera). Although this particular embodiment carries a video camera as the electrical device, it could instead be a lighting apparatus, such as an LED lighting apparatus. The camera 22 (and/or lighting apparatus) is electrically connected to an output of an electrical energy storage assembly (not shown) located within the cabinet 4

The cabinet 4 is secured to a steel base 24 which is described in more detail hereinbelow.

The post 6 also carries a wireless access point 26 which is capable of receiving and transmitting data at up to 125 Mbps. The wireless access point 26 is also electrically connected to an output of the electrical energy storage assembly. Such wireless access points are well known in the art and as such, it will not be described in detail herein.

Figure 2:
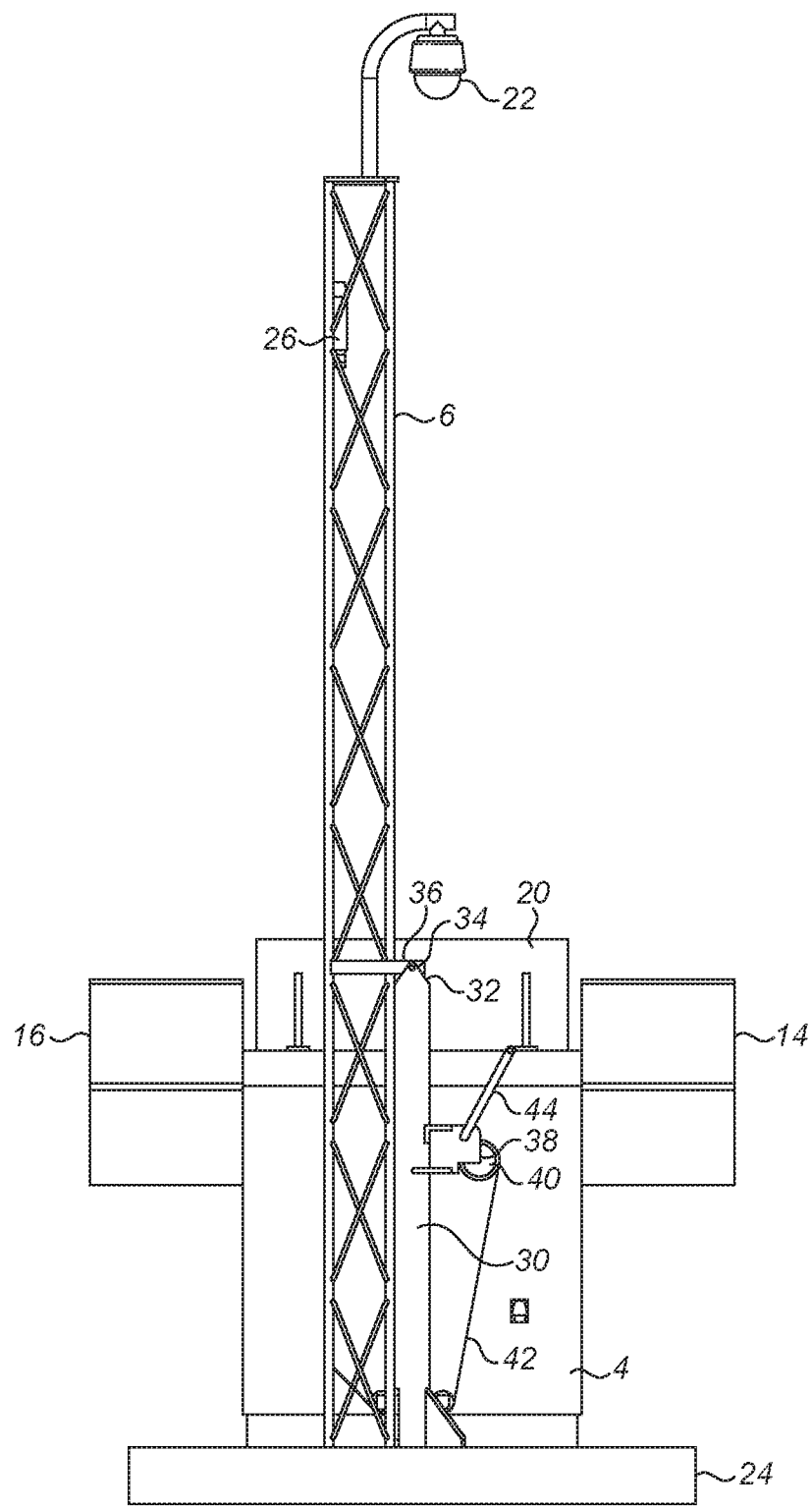
FIG. 2 is a rear elevational view of the apparatus shown in FIG. 1.

Turning now to FIG. 2, it will be appreciated that the post 6 is connected to the base 24 via a mounting element 30. The mounting element 30 is securely fixed to the base 24 at one end thereof and includes at the other end thereof one part of a fulcrum. The mounting element 30 defines a pair of opposed legs 32 at its upper portion, each of which defines a respective aperture 34 therethrough. The fulcrum is defined by the pair of apertures 34 and a corresponding pair of pivot arms 36 carried by the post 6. The pivot arms 36 are arranged to be parallel and coextensive. Each pivot arm 36 is bolted to a respective aperture 34 such that the pivot arms can rotate relative to mounting element 30 and consequently, the post 6 can be pivoted relative to the mounting element 30.

The post includes a latching element (not shown) which is adapted to latch the post in a substantially vertical orientation (i.e. perpendicular to the base 24).

In order to pivot the post 6 for access to the camera 22 (or other carried electrical device) and/or the wireless access point 26, a winch 38 is provided. The winch comprises a cable drum 40 which has a cable 42 wound therearound. The cable drum 40 is connected to an operating handle 44 via a geared arrangement, whereby rotation of the handle in a first direction causes the cable 42 to be unwound from the cable drum 40 and permits the post 6 to pivot relative to the mounting element 30 to a horizontal or lowered orientation (as shown in FIG. 4). The handle can be rotated in the opposite sense which causes the cable 42 to be wound onto the cable drum 40, which raises the post 6 to its upright orientation (as shown in FIGS. 1 to 3).

Figure 3:
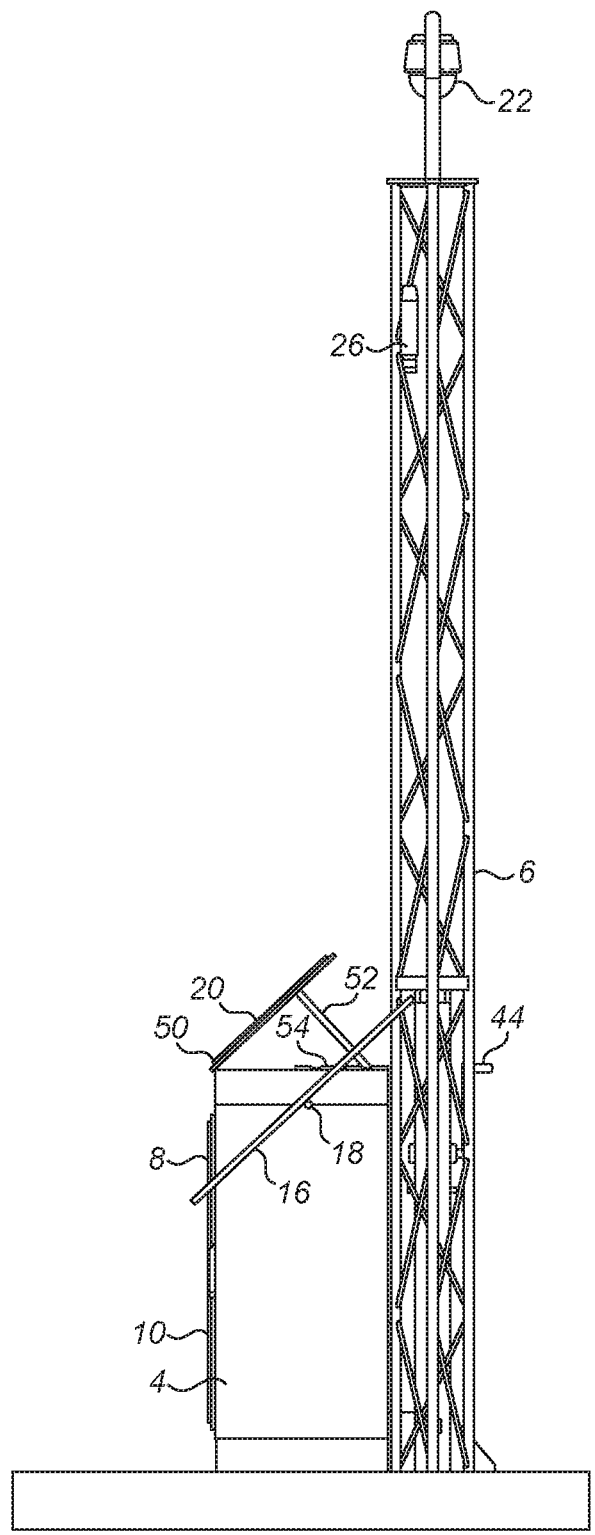
FIG. 3 is a side elevational view of the apparatus shown in FIG. 1.
Figure 4:
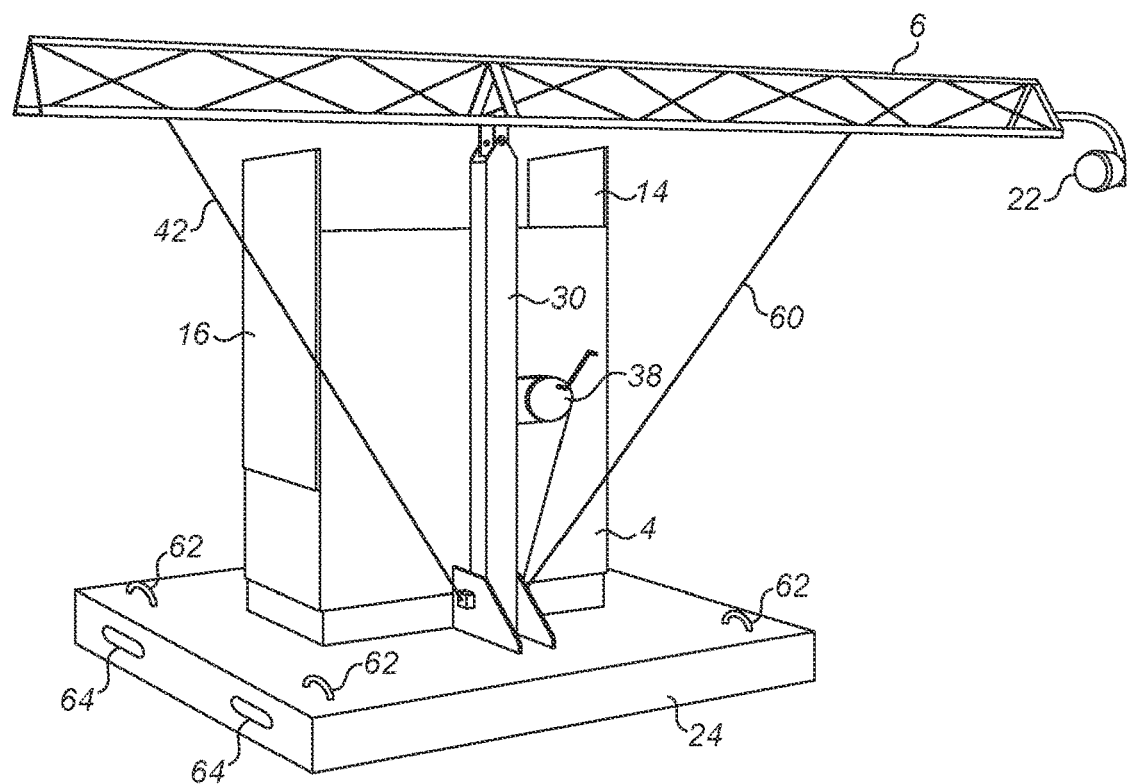
FIG. 4 is perspective view of the apparatus shown in FIG. 1 in its transportation configuration.

FIG. 3 shows a side elevational view of the apparatus 2. This view shows the orientation of the various photovoltaic panels. As noted above, the panels 8 and 10 are fixed to the front of the cabinet 4 in a vertical orientation. The panels 14 and 16 (only panel 16 can be seen in FIG. 3) are pivotally coupled to the sides of the cabinet 4 via the common orientation rod 18. An orientation control assembly (not shown) is located inside the cabinet and is used to vary the orientation of the rod (and thereby the orientation of the panels 14, 16) or to lock the rod 18 in a fixed orientation. The orientation control assembly allows for the panels 14, 16 to be moved from a substantially horizontal configuration to a substantially vertical orientation as desired. The exact orientation of the panels 14, 16 at any given time will be based on the attitude of the sun in the sky.

The photovoltaic panel 20 is hingedly coupled to the top of the cabinet 4 via a hinge 50 provided at its front edge. The orientation of the panel 20 relative to a horizontal plane is controlled by a stay 52 which is hingedly coupled at one end thereof to the rear of the panel 20 and engages an orientation controller 54 at its other end. The orientation controller defines a number of notches, each of which is configured to receive therein the free end of the stay 52 and each of which defines a fixed orientation of the panel 20 relative to a horizontal plane.

FIG. 4 shows the apparatus 2 in a transport configuration. It can be seen that the post 6 has been pivoted about the mounting element 30 until it is in a substantially horizontal orientation. The post 6 is maintained in this orientation by a rigid steel anchor 60 which extends from the post 6 to the base of the mounting element 30.

It can also be seen in FIG. 4 that the panels 14, 16 have been folded such that they are parallel and adjacent to the sides of the cabinet 4 and the panel 20 has been folded such that it is parallel and adjacent to the top of the cabinet 4.

FIG. 4 also shows in more detail the base 24. Four lifting hooks 62 are carried by the base 24 so that each lifting hook 62 is located towards a respective corner of the base 24. Additionally, a pair of forklift slots 64 are defined by each end portion of the base 24 (only one pair of slots are visible in FIG. 4). The hooks 62 allow the apparatus to be lifted via a crane and the forklift slots 64 allow the apparatus to be lifted via a forklift truck.

Figure 5:
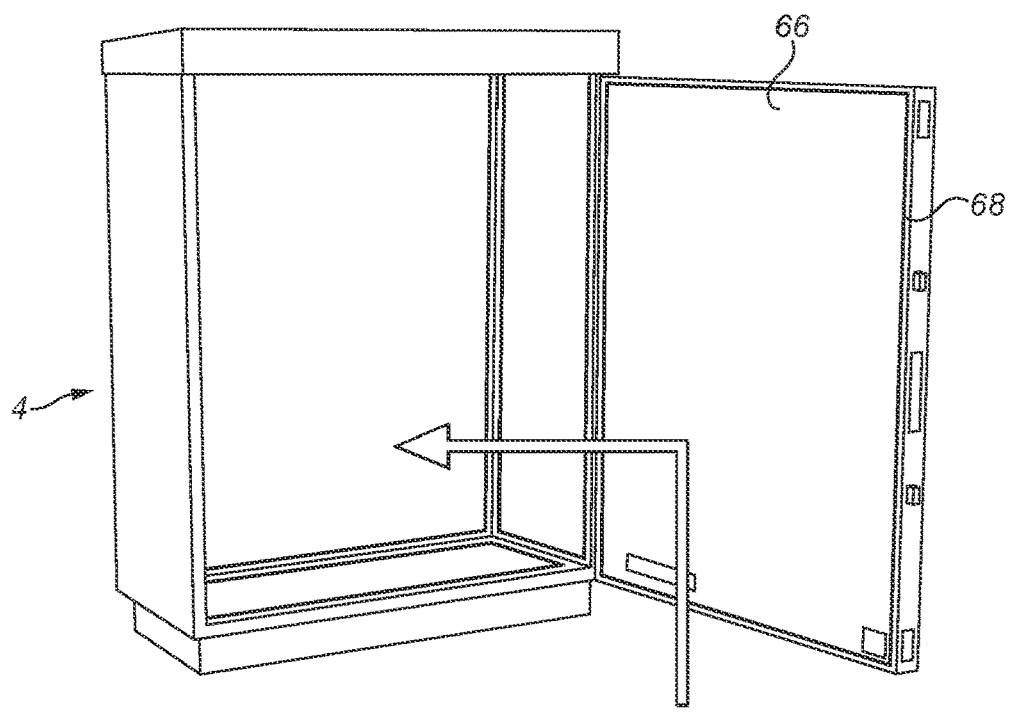
FIG. 5 is a perspective view of the cabinet which forms a part of the apparatus shown in FIG. 1.

FIG. 5 shows the cabinet 4 in more detail. The cabinet 4 includes a welded stainless steel frame and powder coated aluminium panels. The cabinet 4 includes a door 66 which carries around its internal periphery a polyurethane gasket to provide a suitable level of protection against the ingress of dust and water. As noted above, the cabinet 4 is double skinned and comprises an inner skin, an outer skin and an air gap between them within which is located an insulating material (not shown). The outer skin includes vents in the top and bottoms walls to permit communication between the air gap and the environment external to the cabinet 4. The door 66 includes a switch (not shown) which detects when the door is open. The door 66 further includes a latch to maintain it in a closed configuration.

The interior of the cabinet 4 is sized to receive therein a plurality of rechargeable batteries (not shown) and a controller (not shown) to control the flow of electrical energy to and from the batteries. Accordingly, in this embodiment, the battery compartment is defined by the interior of the cabinet 4. The rechargeable batteries are encased in a polymeric material which includes a heating element embedded in the casing. The heating elements of the batteries are connected to the controller in use. The casing for the batteries further includes an exhaust conduit to prevent the build up of any gases generated by the batteries in use. The exhaust conduit passes through the inner skin of the cabinet 4 and terminates in the gap between the two skins.

The rechargeable batteries are electrically connected to an output from the photovoltaic panels 8, 10, 14, 16, 20 via the controller. The controller conditions the electrical energy received from the panels 8, 10, 14, 16, 20 and the conditioned electrical energy is stored by the rechargeable batteries for use in powering the electrical devices electrically connected to the batteries.

In use, the apparatus 2 is transported to the desired location by a suitable vehicle, such as a flat-back lorry. It is then removed from the vehicle by a forklift truck or a crane using the lifting hooks 62 or the forklift slots 64. When in position, the plurality of rechargeable batteries are located within the cabinet 4 and are connected to the controller.

The camera 22 is located at the top of the post 6, the steel anchor 60 is removed and the post 6 is winched into a vertical orientation using the winch 38. When in the vertical orientation, the post 6 is latched in the upright orientation. The photovoltaic panels 14, 16, 20 are then placed in the correct orientation, which is dependent upon the time of year and attitude of the sun in the sky.

The photovoltaic cells 8, 10, 14, 16, 20 and the camera 22 are also connected to the controller.

The irradiation of the photovoltaic panels 8, 10, 14, 16, 20 with sunlight generates electrical energy which is conditioned by the controller and used to charge the batteries. In turn, the batteries power the camera 22 and also the wireless data access point 26. When the temperature drops below a pre-determined threshold value, the controller energises the heating elements to maintain the temperature of the batteries above a minimum temperature. As an alternative to providing heating elements within an enclosure around each battery, the batteries may be located within a compartment within the cabinet 4 and the compartment may include one or more heating elements.

The photovoltaic panels 14, 16 and 20 may be manually moved periodically in accordance with the changing attitude of the sun in the sky, or they may be moved automatically by an optional panel movement apparatus incorporated into the apparatus 2.

In the event of snow or a build up of contaminants on the panels 14, 16, 20, the vertical panels 8, 10 will continue to generate electrical energy.

The invention claimed is:

1. A power generating apparatus for use in remote locations, the apparatus including a static base configured to support a housing and an elongate device support element which is configured to be upstanding in use, wherein the housing is thermally insulated and the thermal insulation is provided by the housing comprising an outer housing wall and an inner housing wall and a gap is defined between the inner and outer housing walls or an insulating material may be carried by the walls of the housing; an electrical energy storage assembly is located within a compartment defined by the housing, the electrical energy storage assembly having an electrical input and an electrical output, and comprising one or more rechargeable batteries; an electrical energy generator carried externally by the housing, wherein the electrical energy generator is the sole source of electrical energy and is powered by at least one renewable energy source selected from solar energy and wind energy, the electrical energy generator including one or more photovoltaic panels configured to convert solar energy into electrical energy, the electrical energy from the electrical energy generator being electrically connected to the input of the energy storage assembly; and a powered device carried by the device support element, the powered device being selected from a camera, a lighting apparatus, a wireless communications assembly and combinations thereof, wherein the powered device is electrically coupled to the output of the energy storage assembly.

2. A power generating apparatus according to claim 1, wherein the electrical energy generator comprises two or more photovoltaic panels.

3. A power generating apparatus according to claim 2, wherein the electrical energy generator comprises at least one fixed photovoltaic panel and at least one movable photovoltaic panel which has a variable orientation.

4. A power generating apparatus according to claim 3, wherein the fixed photovoltaic panel has a substantially vertical orientation.

5. A power generating apparatus according to claim 1, wherein at least one of the compartment and the or each battery includes a heater element.

6. A power generating apparatus according to claim 5, wherein the or each heater element is electrically powered.

7. A power generating apparatus according to claim 6, wherein the or each heater element is electrically connected to the output of the energy storage assembly.

8. A power generating apparatus according to claim 1, wherein the housing includes a vent.

9. A power generating apparatus according to claim 8, wherein the vent is closable and defines a vented configuration in which the interior of the housing is in fluid communication with an external environment, and a closed configuration in which the interior of the housing is isolated from the external environment.

10. A power generating apparatus according to claim 1, wherein the energy storage assembly includes a vent conduit in fluid communication with an environment external to the housing, whereby gases generated by the energy storage assembly in use are vented outside of the housing.

11. A power generating apparatus according to claim 1, wherein the or each rechargeable battery is enclosed within a polymeric barrier layer.

12. A power generating apparatus according to claim 11, wherein the or each rechargeable battery includes a heating element located within the barrier layer.

13. A power generating apparatus according to claim 1, wherein the device support element is adapted to pivot relative to the base.

14. A power generating apparatus according to claim 1, wherein the device support element is adapted to telescope relative to the base.

15. A power generating apparatus according to claim 1, wherein the or each photovoltaic panel is flexible.

16. A power generating apparatus according to claim 1, wherein the or each photovoltaic panel is coated with a polymeric barrier layer.

17. A power generating apparatus according to claim 16, wherein the polymeric barrier layer is hydrophobic.

18. A power generating apparatus according to claim 1, wherein the or each photovoltaic panel includes a cleaning apparatus comprising a fluid reservoir, a fluid pump and at least one nozzle adapted to direct a flow of the cleaning fluid across the panel.

19. A power generating apparatus according to claim 1, wherein the apparatus further includes a GPS location device electrically connected to an output from the energy storage assembly.

20. A power generating apparatus according to claim 1, wherein the apparatus further includes a wireless communications receiver/transmitter.

* * * * *